United States Patent [19]

Stazo et al.

[11] Patent Number: 4,881,654
[45] Date of Patent: Nov. 21, 1989

[54] CONTAINER FOR MOUNTING ON HEADGEAR

[76] Inventors: Jack Stazo, 10606 N. Evers, Houston, Tex. 77024; Joseph W. Whitmer, 13106 Loguna, Houston, Tex. 77015

[21] Appl. No.: 295,995
[22] Filed: Jan. 12, 1989
[51] Int. Cl.4 ............................................. B65D 23/08
[52] U.S. Cl. .............................. 220/85 H; 206/315.11; 224/181; 2/199
[58] Field of Search ................. 220/85 H; 206/315.11; 224/181, 182; 2/199, 422, 185 R

[56] References Cited

U.S. PATENT DOCUMENTS

| | | | |
|---|---|---|---|
| 1,869,652 | 7/1930 | Baker | 2/199 |
| 2,209,609 | 7/1940 | Odom | 224/181 |
| 2,597,601 | 5/1952 | Sherman | 224/181 |
| 3,028,059 | 4/1962 | Greenwood | 224/181 |
| 3,813,016 | 5/1974 | Bohannan | 2/199 |
| 4,451,935 | 6/1984 | Henschel | 2/199 |

Primary Examiner—Stephen Marcus
Assistant Examiner—Gilbert W. Reece
Attorney, Agent, or Firm—Kenneth H. Johnson

[57] ABSTRACT

A container with a centrally positioned opening in the bottom adapted to snap on to a button at the apogee of a cap and the combination of the container and cap. The container has a lid with a latch. The opening in the bottom is formed by two or more intersecting cuts, with a center portion at the intersection of the cuts removed to form a hole. This allows the tines formed by the intersecting cuts to deform to allow a button to be pushed through, thereby seating the box on the cap and when desired the container may be removed by the reverse procedure.

18 Claims, 1 Drawing Sheet

CONTAINER FOR MOUNTING ON HEADGEAR

BACKGROUND OF THE INVENTION

1. Field of the Invention

The present invention relates to a container or box, more particularly it relates to fishing tackle box which may be mounted on a cap or other headgear.

2. Related Art

There are thousands of types of tackle boxes for fishing gear. Every type of container from old cigar boxes to the most sophisticated space age construction has been used to store tackle. Also intricate pocketed vest, floats and the like are used for tackle storage.

For the wade fisherman, storage space is at a premium. The pocket vest are useful and styrofoam hats or regular hats for storing hooks are commonly used. However, some items are not easily hooked on a hat, such as weights, touts, swivels, etc.

It is an advantage of the present invention that small items of fishing gear can be stored within easy reach in a box or container which is out of the way. It is a further advantage that the present invention adds storage space on a person in addition to those usually used. It is a further advantage that when used for fishing items kept in the present container can be expected to stay dry. It is a particular feature of the present invention that the box is easily carried with a person so long as they wear an appropriate cap or hat.

SUMMARY OF THE INVENTION

Briefly, the present invention comprises a container having four sides, a bottom and a top with an opening in the bottom adapted to snap on to a button, or other knob like protrusion on headgear and the combination comprising said container and said headgear. More preferably the button or knob is located on a location on the headgear, such that it will be at approximately the apogee of the headgear in the normal upright position with the headgear in place on the wearer. Preferably the headgear will be a hat or cap and the button will be a button located at the upper center of the hat or cap. In another aspect of the invention the container may be permanently affixed to the headgear.

The opening in the bottom of the container may be nothing more than a plurality of intersecting cuts in the bottom of the container, which form a plurality of wedge shaped elements terminating at the intersection of the cuts, such that the wedges can be deformed to allow the button to pass through into the container then to seat under the bottom and hold the container firmly in place. Depending on the flexibility of the container bottom, a portion of the ends of the wedge shaped elements may be cut away, e.g., to form a circular opening. Also the intersecting cuts may be slots.

The container may be made of any material and the bottom may be the same provided that there is sufficient flexibility and resilience for the button to pass through the opening and the wedge shaped elements to snap into place below the button.

DETAILED DESCRIPTION

Figure 1:
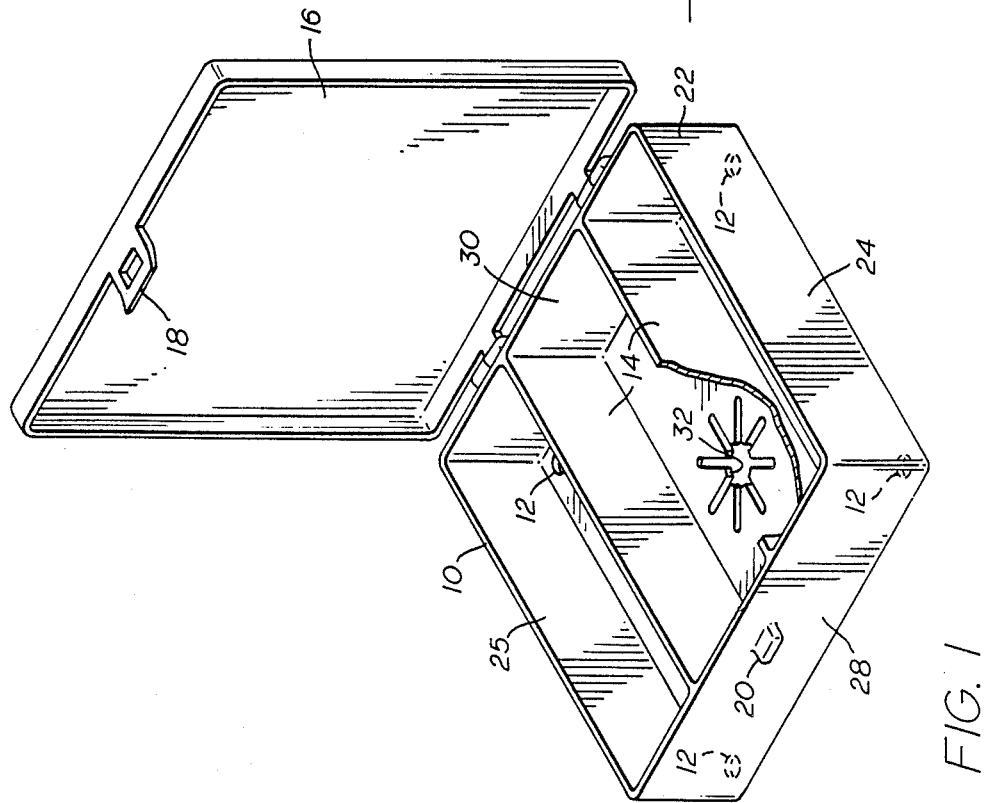
FIG. 1 is a isometric view of the present container.

Referring to FIG. 1, the container 10 is a opaque plastic box with bottom 22, sides 25, 26, 28 and 30, drain holes 12, compartment walls 14, and hinged lid 16 with latch 18 which cooperates with stud 20 to fasten the lid down.

Figure 2:
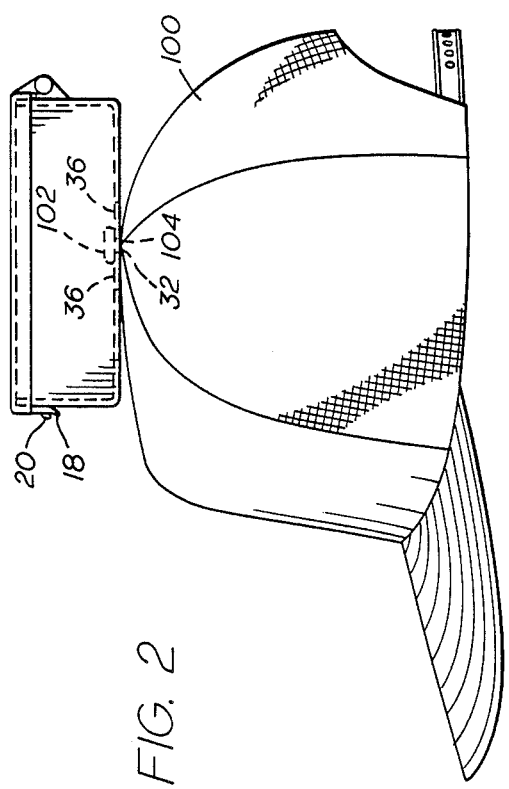
FIG. 2 is side elevational cross section of the container in place on a cap.
Figure 3:
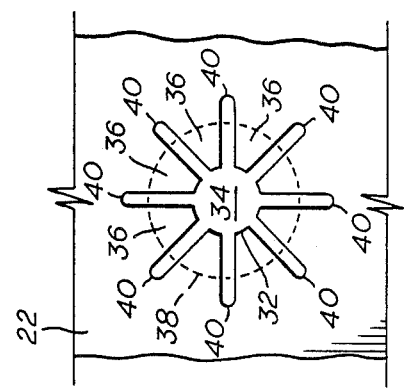
FIG. 3 is a detail of one embodiment of the opening in the bottom of the container.

Located centrally in the container on bottom 22 is opening 32 which is formed by three intersecting slots 40 with a portion of the area adjacent to the intersection point being removed to form a hole 34. A suitable plastic for this is a medium density polypropylene which is rigid yet flexible thus allowing the individual tines 36 to deform upward when pressed by hand (not shown) on to a button 102 of cap 100 and to seat on the button as shown in FIG. 2. When the deformed tines 36 return to their normal position, they grasp the button 102 about attachment 104 which is positioned in the hole 34. Removing the container is the reverse operation, whereby the tines are deformed downward to allow the button to pass out of the opening. The button may be locked in place by the tines thereby permanently attaching the container and headgear, or the container and headgear may be glued, stapled or other wise attached together (not shown).

Figure 4:
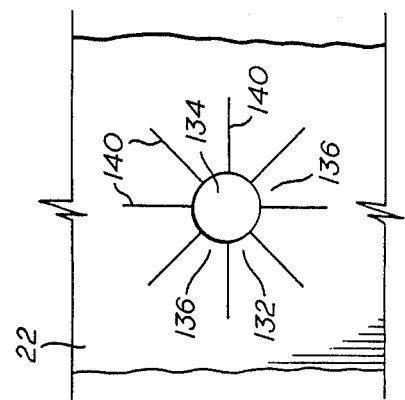
FIG. 4 is an alternative opening embodiment.

FIG. 4 shows an alternative type of opening 132 which uses intersecting slits 140 with a central hole 134. The lines 136 operate in the same manner as previously described to mount the container on the button hence on the cap.

The button 102 should be substantially smaller than the circumference 38 defined by the terminal end of the shortest intersecting slots 40. If the button is larger than this then it will not fit. The button can be substantially smaller, than the circumference 38 but larger than hole 34 or it will not hold the container in place. The cuts (slots or slits) can be substantially the same length or of different length. The container may be rectangular, square, round or any other shape and should be small as noted herein, however is some utilizations the container may be larger than the head of the wearer and serve as a sun shade as well as storage container.

Preferably the button on the cap is centrally located and at the apogee of the headgear.

A lid or other closure is an important feature of the present container since the person wearing the cap is going to move about, and look down, hence the closure is necessary to keep items from falling out of the container. The dimensions of the box may be about 4 inches square and be comfortable to wear. Boxes larger than that can be worn but they become unwieldy. Smaller boxes have less utility.

Although the box is designed for fishing tackle, any other item such as snacks, cigarettes, matches or the like may be carried therein. Furthermore the container may be worn on any occasion not just fishing.

The invention claimed is:

1. A container for mounting on headgear having four sides, a bottom and a top closure means, said bottom having an opening therein formed by the intersection of at least two cuts to form a plurality of tines, said opening being deformable to allow penetration of a button from said headgear, said button being of smaller diameter than the circumference of the terminal end of the shortest cut.

2. The container according to claim 1 wherein said top closure is a hinged lid with a latching meaning.

3. The container according to claim 2 wherein said opening is centrally position in said bottom.

4. The container according to claim 3 wherein aid cuts are intersecting slots.

5. The container according to claim 3 wherein said cuts are intersecting slits.

6. The container according to claim 3 wherein a portion of said tines adjacent to the intersection is removed to define a hole.

7. The container according to claim 6 wherein said container is divided into compartments.

8. The container according to claim 6 wherein said container has additional openings in the bottom for drainage.

9. In combination:
(a) a headgear having a button means attached thereon and
(b) a container having four sides a bottom and a top closure means, said bottom having an opening therein formed by the intersection of at least two cuts to form a plurality of tines, said container being removably remounted on to said button means through said opening.

10. The combination according to claim 9 wherein said button is centrally positioned on said headgear.

11. The combination according to claim 10 wherein said button is positioned at the apogee of said headgear.

12. The combination according to claim 9 wherein said top closure is a hinged lid with a latching means.

13. The combination according to claim 12 wherein said opening is centrally positioned in said bottom.

14. The combination according to claim 13 wherein said cuts are intersecting slots.

15. The combination according to claim 13 wherein said cuts are intersecting slits.

16. The combination according to claim 13 wherein a portion of said tines adjacent to said intersection is removed to define a hole, said hole being smaller than said button means.

17. The combination according to claim 16 wherein said container is divided into compartments.

18. The combination according to claim 16 having additional openings in the bottom for drainage.

* * * * *